3,830,847
SELECTIVE OXIDATION OF OLEFINS

R. Parthasarathy, Takoma Park, John L. Warthen, Baltimore, and Frank G. Ciapetta, Silver Spring, Md., assignors to W. R. Grace & Co., New York, N.Y.
No Drawing. Division of abandoned application Ser. No. 591,954, Nov. 4, 1966. Divided and this application Jan. 29, 1970, Ser. No. 12,529
Int. Cl. C07c 45/04

U.S. Cl. 260—604 R               5 Claims

ABSTRACT OF THE DISCLOSURE

A process for converting alpha mono-olefinic hydrocarbons (less than 8 carbon atoms) to the corresponding unsaturated aldehyde is disclosed. The catalyst is a mixture of bismuth oxide, molybdenum oxide and small, promotional amounts of a platinum type transition metal oxide of a Group VIII metal.

---

This application is a divisional application of U.S. application Ser. No. 591,954, filed Nov. 4, 1966 now abandoned.

This invention relates to an improved process for the production of aldehydes having unsaturation in the alpha position. In one particular embodiment, the invention relates to an improved process for the direct vapor phase oxidation of propylene and/or isobutylene to acrolein or methacrolein respectively.

Acrolein and methacrolein are principally of interest as intermediates for the preparation of the corresponding aliphatic monocarboxylic acids. Aliphatic monocarboxylic acids having alpha beta unsaturation such as acrylic acid and methacrylic acid, for example, are valuable starting and intermediate materials for a whole series of reactions because of their highly reactive nature. However, their reactive nature also makes these materials difficult to prepare and contributes to the problems encountered in large scale production of these acids.

It has been recognized for sometime that a potential source of alpha beta unsaturated acids are the corresponding olefins. However, wide scale production of the acids from this group has not followed because of the relatively low yields and costly operational steps involved in the available processes.

The oxidation of the olefin to the acrylic acid goes through an intermediate step when the aldehyde is produced. These aldehydes are readily oxidized to the alpha beta monocarboxylic acids. Our novel process is directed to the preparation of the aldehydes and has the greatest utility as the first stage of a two-stage system for the conversion of the olefins to the monocarboxylic acids. The process also has the utility as a single stage process for the preparation of the aldehydes, specifically acrolein and methacrolein.

One highly satisfactory method of operation involves the selective oxidation of propylene to acrylic acid and of isobutylene to methacrylic acid in a system of sequential reactors. In this system, the olefin is admixed with air and steam and is passed through the reactor containing a catalyst selective for converting the olefin to the alpha beta unsaturated aldehyde. Our novel catalyst is particularly useful in this stage of such a reactor. The effluent of the first stage is rapidly quenched and passed directly into the second reactor containing any catalyst suitable for converting the alpha beta unsaturated aldehyde to the corresponding carboxylic acid.

This process is particularly attractive since there is no intermediate product separation between the two reactors and the system is truly an integrated system. The use of sequential reactor permits operation of each reactor at its optimum conditions with respect to feed compositions, feed rate, temperature, pressure, etc. The use of this system in a single pass conversion of greater than 70 percent of propylene or isobutylene with yields as high as 70 percent acrylic acid or methacrylic acid.

We have found that although the use of a mixed bismuth oxide-molybdenum oxide catalyst in the vapor phase oxidation of olefins to unsaturated aldehydes, particularly the vapor phase conversion of propylene and/or isobutylene to acrolein and/or methacrolein gives satisfactory results, the promotion of this catalyst with small but significant amounts of rare earth and transition metal oxide promoters results in a greatly improved yield of the unsaturated aldehyde product. Thus, we have found that rare earth or transition metal oxide promoted bismuth oxide-molybdenum oxide catalyst containing small but critical amounts of the promoters results in a selective conversion of propylene to acrolein. The addition of more than the critical amount of these materials does not result in an appreciable improvement in the yield or selectivity of the process.

The hydrocarbon raw material used in the process of our invention can be broadly defined as olefinic unsaturated hydrocarbons. The invention is particularly applicable to normally gaseous hydrocarbons containing propylene and/or isobutylene. Propylene is converted to a reaction product containing substantial amounts of acrolein and isobutylene to substantial amounts of methacrolein.

It is not necessary that the olefin be purified. The raw material for use in our process may contain other hydrocarbons in a vapor state which do not undergo substantial reactions but which do not adversely affect the oxidation under the conditions of our process. Thus, the feedstocks of our process may contain, in addition to unsaturated olefinic hydrocarbon, such as propylene and/or isobutylene, for example, other parafinic hydrocarbons, such as methane, ethane, propane and butanes which are in the vapor phase in the conditions of operation of our process.

In accordance with our process, the olefin containing charge is admixed with water vapor and added oxygen in the form of an oxygen containing gas or oxygen in relatively pure form and is passed through either a single stage reactor or two stages of a sequential reactor that is described above wherein either the first reaction zone in a sequential reactor or the reactor itself in a single stage process contains our novel catalyst.

The oxygen for use in this process may be recovered from the fractionation of air or may be a more dilute oxygen containing gas. A suitable source of oxygen comprises, for example, molecular oxygen in admixture with an inert gas such as nitrogen. Air may be used as the source of molecular oxygen reactant. The oxygen containing charge may be admixed with the olefinic charge of the system before it is introduced in the reaction zone, but it may be introduced in part or in its entirety into the reaction at one or more points in the reaction zone. Once the reactants are passed into the reaction zone, they are contacted with the catalyst.

In investigating catalysts for the reaction of alpha olefins to prepare the corresponding unsaturated aldehydes, we have found that a co-precipitated bismuth oxide-molybdenum oxide promoted with rare earths or transition metal oxide promoters to be highly selective. Although the bismuth oxide-molybdenum oxide catalyst by itself gives satisfactory results, we have found that promotion of this catalyst improves both the selectivity and yield of the process. Comparable improvements in selectivity and yield in the system also result when the caatlyst is bismuth tungstate or bismuth phosphomolybdate containing the above mentioned promoters for example.

The promoters are divided into two groups, the rare earths and the transition metal oxides. Any oxides of the rare earth elements (Elements 57 through 71 of the Periodic Table) can be used. One satisfactory source of these rare earth oxides are the mixed rare earth oxides sold commercially as didymium oxides. The mixed rare earth oxides sold as lanthanum rich rare earth oxides also give satisfactory results. In cases where the individual rare earths are used, samarium, lanthanum, praseodymium, neodymium are the preferred promoters.

The other promoters that give satisfactory results are the Group VIII metals such as palladium. The addition of these promoters to the bismuth oxide-molybdenum oxide catalyst system permits calcination of these promoted catalysts at elevated temperatures without drastic loss in their activities. The resultant catalysts show superior mechanical strength and have improved selectivity. High temperature calcination of the unpromoted catalyst, for example, improves its mechanical strength and acrolein selectivity at low conversions, but severely lowers its activity and enhances oxidation to carbon monoxide and carbon dioxide at high conversions. The addition of the promoter to the bismuth oxide-molybdenum oxide catalyst system decreases the temperature required for the same conversion without adversely effecting the selectivity.

The promoted bismuth oxide-molybdenum oxide catalyst of this invention may be prepared by co-precipitation of the bismuth-oxide and molybdenum oxide in the presence of the desired quantity of the promoter. Thus, a bismuth nitrate solution is mixed with a promotional amount of the desired promoter (samarium, for example) and this mixture is then mixed with a source of molybdenum such as ammonium molybdate. The precipitation is completed by adjusting the pH. The resulting mixture is then dried, filtered, if desired, and calcined.

The preferred catalyst contains a bismuth to molybdenum ratio of 1.0 to 1.2. The amount of promoter added depends on the type of promoter used. When the promotional agent is rare earth salt, for example, the rare earth is present in an amount equal to 0.01 g. atom per g. atom of Mo to not more than 0.1 g. atom per g. atom of Mo. When the promotional agent is a Group VIII metal, such as palladium, for example, it is present in an amount equal to 0.005 to 0.25 weight percent. Another advantage of promotion of the bismuth oxidemolybdenum oxide catalyst results from the ability of these catalysts to be calcined at high temperature when the bismuth oxide-molybdenum oxide catalyst is mixed with a proper amount of a promoter, for example, it can be calcined at temperatures as high as 1200° F. without any appreciable decrease in the activity and selectivity of the catalyst. This is not possible in the unpromoted catalyst.

The invention is further illustrated by the following specific but non-limiting examples.

EXAMPLE I

This example illustrates one method of preparing a samarium promoted bismuth oxide-molybdenum oxide catalyst.

A total of 242.5 grams of bismuth nitrate $$Bi(NO_3)_3 \cdot 5H_2O$$

was dissolved in 150 ml. of a ten percent solution of nitric acid. A total of 9 grams of the samarium salt, samarium nitrate $(SmNO_3)_3 \cdot 6H_2O$ was added. This mixture was stirred well and added to a solution of 85.5 grams of ammonium molybdate

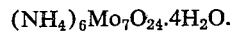
$$(NH_4)_6Mo_7O_{24} \cdot 4H_2O.$$

This ratio of reactants included 0.5 grams atoms of bismuth, 0.02 gram atoms of samarium, and 0.5 gram atoms of molybdenum. The components were mixed together with stirring. Moderate thickening occurred. The pH of the resulting slurry was 0.2. A total of 210 ml. of a 1 to 1 ammonium hydroxide solution was added with stirring to increase the pH to 5.5. Stirring was continued and the slurry was heated to 60° C. Considerable thickening took place. The slurry was held for 1 hour at 60° C., filtered and washed in 3 liters of deionized water. The product was dried for 16 hours at 220° F. and calcined for 16 hours at 1000° F. That portion of the product in the 6 to 25 mesh size range was separated from the fines and used as the catalyst. A total of 147.4 grams of catalyst was prepared by this method.

EXAMPLE II

This example describes the method of preparing the bismuth oxide-molybdenum oxide catalyst promoted with palladium.

A total of 242.5 grams of bismuth nitrate pentahydrate was dissolved in 150 ml. of 10% nitric acid. A 10% palladium nitrate solution (19 ml.) was added with stirring. A solution of ammonium molybdate was prepared by dissolving 88.5 grams of ammonium molybdate

$$(NH_4)_6MoO_{24} \cdot 4H_2O$$

in 175 ml. of deionized water. The bismuth-palladium salt solution was added to the ammonium molybdate solution with rapid stirring. The pH was 0.2 at this point. A total of 195 ml. of a 1 to 1 ammonium hydroxide solution was added to adjust the pH to 5.5. The temperature of the solution had increased to 42.8° C. The slurry was heated to 62° C. and held at this temperature for one hour, filtered and washed with deionized water. The product was dried for 16 hours at 220° F. and calcined for 16 hours at 1000° F. The product in the 6 to 25 mesh size range was separated and used as the catalyst for the reaction. A total of 162.7 grams of the catalyst was prepared in this run.

EXAMPLE III

This example illustrates the improvement that results on the promotion of the catalyst with samarium and palladium.

In this series of runs, 50 ml. of the catalyst was charged in an aluminized stainless steel reactor, heated to the desired reaction temperature. The catalyst was continually contacted with a propylene-air-steam feed mixture at atmospheric pressure. The feed contained 5 mole percent propylene, 50 mole percent air and 45 mole percent steam. The results collected in this series of runs is set out in the following table:

TABLE I

| Mixed oxide catalyst system | Catalyst calcination temperature (in ° F.) | Reactor temperature (in ° F.) | Propylene conversion (in percent) | Yield of major products (in percent) | | | |
|---|---|---|---|---|---|---|---|
| | | | | Acrolein | $CH_3CHO$ | HCHO | CO and $CO_2$ |
| $Bi-Sm_{0.04}-MoO_{4.56}$ | 1,000 | 775 | 70 | 54 | 19 | 12 | 56 |
| | 1,100 | 825 | 70 | 65 | 14 | 10 | 48 |
| | 1,200 | 940 | 70 | 77 | 7 | 6 | 46 |
| $Bi-MoO_{4.5}$ | 1,000 | 940 | 70 | 70 | 10 | 4 | 46 |
| | 1,150 | 1,020 | 60 | 74 | 3 | 4 | 50 |
| $Bi-MoO_{4.5}$ with 0.01 wt. percent Pd | 1,000 | 850 | 70 | 68 | 10 | 9 | 35 |
| | 1,100 | 895 | 70 | 72 | 6 | 8 | 38 |

It is apparent from these data that a substantial improvement in the catalyst activity and acrolein selectivity results when the bismuth oxide-molybdenum oxide is promoted with samarium. The catalyst was more active giving a higher conversion (70 percent) at a temperature which was 80° F. lower compared to the unpromoted catalyst. The acrolein selectivity increased to 77 percent when the catalyst was promoted with samarium. Promotion of this catalyst with palladium also gave very good results. Even such a small amount as 0.01 weight percent palladium in the catalyst substantially improved its activity without any appreciable change in acrolein selectivity. Thus, the palladium promoted catalyst converted the same amount of propylene at a temperature which was as much as 90° F. lower compared to the unpromoted catalyst and yet the promoted catalyst retained an acrolein selectivity as high as 72 percent.

EXAMPLE IV

This example illustrates efficiency of the samarium promotion. The amount of samarium added as the promoting agent was varied and the results noted.

The runs were carried out using the reactor described in Example III. The reactor was charged with 50 ml. of catalyst and the catalyst was contacted with a feed mixture containing 5 mole percent propylene, 50 mole percent air and 45 mole percent steam. The results collected in this series of runs are set out in Table II below:

TABLE II

| Mixed oxide catalyst system | Reactor temperature (in ° F.) | Propylene conversion (in percent) | Yield of major products (in percent) | | | |
|---|---|---|---|---|---|---|
| | | | Acrolein | $CH_3CHO$ | HCHO | CO and $CO_2$ |
| Bi-$Sm_{0.01}$-$MoO_{5.5}$ | 897 | 79.6 | 67.9 | 6.9 | 7.1 | 64 |
| Bi-$Sm_{0.02}$-$MoO_{4.53}$ | 904 | 86.9 | 71.5 | 8.8 | 7.4 | 49 |
| Bi-$Sm_{0.04}$-$MoO_{4.54}$ | 775 | 70 | 54 | 19 | 12 | 56 |
| | 940 | 70 | 77 | 7 | 6 | 46 |
| | 825 | 70 | 65 | 14 | 10 | 48 |
| Bi-$Sm_{0.06}$-$MoO_{4.59}$ | 836 | 63.4 | 63.4 | 9.4 | 12.3 | 73.4 |

It is apparent from these data that satisfactory propylene conversion to acrolein results when the catalyst contains 0.01 to 0.04 gram atom of samarium per gram atom of molybdenum. The results were not particularly satisfactory when the samarium content was increased to 0.06 gram atom of samarium per gram atom of molybdenum.

Obviously many modifications and variations in the invention may be made without departing from the essence and scope thereof and only such limitations should be applied as are indicated in the appended claims.

What is claimed is:

1. The process for the conversion of alpha mono-olefinic hydrocarbons containing fewer than 8 carbon atoms in the molecule to a reactant mixture comprising substantial amounts of aldehydes having unsaturation in the alpha position corresponding to said olefinic hydrocarbons which comprises reacting said olefinic hydrocarbon in the vapor phase with an oxygen containing gas at a temperature of 700° F. to 1000° F. in a bed of catalyst consisting essentially of a mixture of (i) bismuth oxide, (ii) molybdenum oxide and (iii) 0.005 to 0.25% palladium and recovering the aldehyde product.

2. The process according to Claim 1 wherein the catalyst is promoted with about 0.005 to 0.10 weight percent palladium.

3. The process according to Claim 1 wherein the olefin is selected from the group consisting of propylene and isobutylene and the catalyst is bismuth molybdate promoted with about 0.005 to 0.10 weight percent palladium.

4. The process according to Claim 1 wherein the olefin is propylene, the oxygen containing gas is air and the reaction is carried out at a temperature of about 775 to 925° F. in the presence of steam.

5. The process according to Claim 1 wherein the olefin is isobutylene.

References Cited

UNITED STATES PATENTS

| 3,485,877 | 12/1969 | Hargis et al. | 260—604 R |
| 2,941,007 | 6/1960 | Callahan et al. | 260—604 R |
| 3,576,764 | 4/1971 | Yamaguchi et al. | 260—604 R |

FOREIGN PATENTS

| 6512930 | 4/1966 | Netherlands | 260—604 R |

LEON ZITVER, Primary Examiner

R. H. LILES, Assistant Examiner

U.S. Cl. X.R.

252—456, 465, 462